(12) United States Patent
Ng et al.

(10) Patent No.: US 11,541,940 B1
(45) Date of Patent: Jan. 3, 2023

(54) STRUCTURAL MOUNT ASSEMBLY AND VEHICLE HAVING STRUCTURAL MOUNT ASSEMBLY

(71) Applicant: Ford Global Technologies, LLC, Dearborn, MI (US)

(72) Inventors: Samson Ng, Farmington Hills, MI (US); Dragan B. Stojkovic, Taylor, MI (US); Joshua Jacob Clement, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/351,403

(22) Filed: Jun. 18, 2021

(51) Int. Cl.
  *B60R 11/04* (2006.01)
  *B62D 25/06* (2006.01)
  *B62D 27/02* (2006.01)
  *B62D 25/02* (2006.01)
  *B60R 11/00* (2006.01)

(52) U.S. Cl.
  CPC .............. *B62D 25/06* (2013.01); *B60R 11/00* (2013.01); *B60R 11/04* (2013.01); *B62D 25/025* (2013.01); *B62D 27/02* (2013.01); *B60R 2011/004* (2013.01); *B62D 27/023* (2013.01)

(58) Field of Classification Search
  CPC ...... B62D 25/02; B62D 25/06; B62D 27/023; B60R 11/00; B60R 11/04; B60R 2011/004

USPC .... 296/216.06, 216.07, 216.09, 210, 203.01, 296/203.03
See application file for complete search history.

(56) References Cited

U.S. PATENT DOCUMENTS

| | | | |
|---|---|---|---|
| 5,303,974 A * | 4/1994 | Schlapp | B60R 13/0212 296/216.07 |
| 7,942,475 B2 | 5/2011 | Murray | |
| 10,046,713 B2 * | 8/2018 | Maranville | B60R 9/04 |
| 10,272,850 B2 | 4/2019 | Frank et al. | |
| 2017/0305242 A1 | 10/2017 | Gallagher et al. | |

FOREIGN PATENT DOCUMENTS

| | | | |
|---|---|---|---|
| CN | 212447334 | 2/2021 | |
| DE | 19716552 A1 * | 11/1998 | B60Q 1/2611 |
| DE | 102019122168 | 2/2021 | |

* cited by examiner

*Primary Examiner* — Dennis H Redder
(74) *Attorney, Agent, or Firm* — Burris Law, PLLC (57) ABSTRACT

A structural mount assembly for a roof panel of a vehicle. The structural mount assembly includes an exterior bracket and a plurality of interior brackets. The exterior bracket is secured to an exterior surface of the roof panel. The exterior bracket includes a plurality of stanchions for mounting a sensor structure. The plurality of interior brackets are disposed on an interior surface of the roof panel and being secured to the exterior bracket through the roof panel.

20 Claims, 8 Drawing Sheets

STRUCTURAL MOUNT ASSEMBLY AND VEHICLE HAVING STRUCTURAL MOUNT ASSEMBLY

FIELD

The present disclosure relates to a sensor mount assembly and a vehicle having a roof with a sensor mount assembly.

BACKGROUND

The statements in this section merely provide background information related to the present disclosure and may not constitute prior art.

Autonomous vehicles have one or more sensor structures to provide situational information to a vehicle controller. The sensor structures may be mounted to a roof of the vehicle via a bracket and/or other support members. The roof of the vehicle is typically modified to provide for the brackets and/or support members to assist in supporting the sensor structure. Such modification includes drilling holes in the roof of the vehicle, for example, which increases the time it takes to mount the sensor structure to the roof of the vehicle.

These mounting issues related to sensor structures, among other issues related to mounting sensor structures to a vehicle, are addressed by the present disclosure.

SUMMARY

This section provides a general summary of the disclosure and is not a comprehensive disclosure of its full scope or all of its features.

In one form, the present disclosure provides a structural mount assembly for a roof panel of a vehicle. The structural mount assembly includes an exterior bracket and a plurality of interior brackets. The exterior bracket is secured to an exterior surface of the roof panel. The exterior bracket includes a plurality of stanchions for mounting a sensor structure. The plurality of interior brackets are disposed on an interior surface of the roof panel and being secured to the exterior bracket through the roof panel.

In variations of this structural mount assembly, which may be implemented individually or in any combination: each interior bracket includes a roof attachment portion and a frame attachment portion; the roof attachment portion is secured to the exterior bracket through the roof panel and the frame attachment portion is secured to a vehicle frame; the exterior bracket is mechanically fastened to the exterior surface of the roof panel; the exterior bracket is secured to the exterior surface of the roof panel via welding or clinching; the exterior bracket has a D-shaped profile; the interior brackets are mechanically fastened to the exterior bracket through the roof panel; the interior brackets are secured to the exterior bracket through the roof panel via clinching or welding; the exterior bracket is located entirely external to the vehicle; two of the interior brackets are secured to opposed sides of the exterior bracket; the opposed sides extend along a length of the vehicle; at least one of the interior brackets extends in a transverse direction relative to a longitudinal direction of the vehicle; and the exterior bracket is U-shaped.

In another form, the present disclosure provides a structural mount assembly for a roof panel of a vehicle. The structural mount assembly includes an exterior bracket, a sensor structure, and a plurality of interior brackets. The exterior bracket is secured to an exterior surface of the roof panel. The exterior bracket includes a plurality of stanchions. The sensor structure is mounted to the stanchions of the exterior bracket. The plurality of interior brackets are disposed on an interior surface of the roof panel and between a respective side of the exterior bracket and a respective roof rail. The interior brackets being secured to the exterior bracket through the roof panel.

In some configurations of the structural mount assembly of the above paragraph, the exterior bracket and the interior brackets are made of a metal material.

In yet another form, the present disclosure provides a vehicle that includes a roof panel, an exterior bracket, a sensor structure, and a plurality of interior brackets. The exterior bracket is secured to an exterior surface of the roof panel. The exterior bracket includes a plurality of stanchions. The sensor structure is mounted to the stanchions of the exterior bracket. The plurality of interior brackets are disposed on an interior surface of the roof panel and being secured to the exterior bracket through the roof panel.

In variations of this vehicle, which may be implemented individually or in any combination: the interior brackets extend in a transverse direction relative to the roof panel; each interior bracket includes a roof attachment portion and a frame attachment portion; the roof attachment portion is secured to the exterior bracket through the roof panel and the frame attachment portion is secured to a respective roof rail; the vehicle further includes opposed roof rails; and each interior bracket being positioned between a respective roof rail and a respective side of the exterior bracket.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
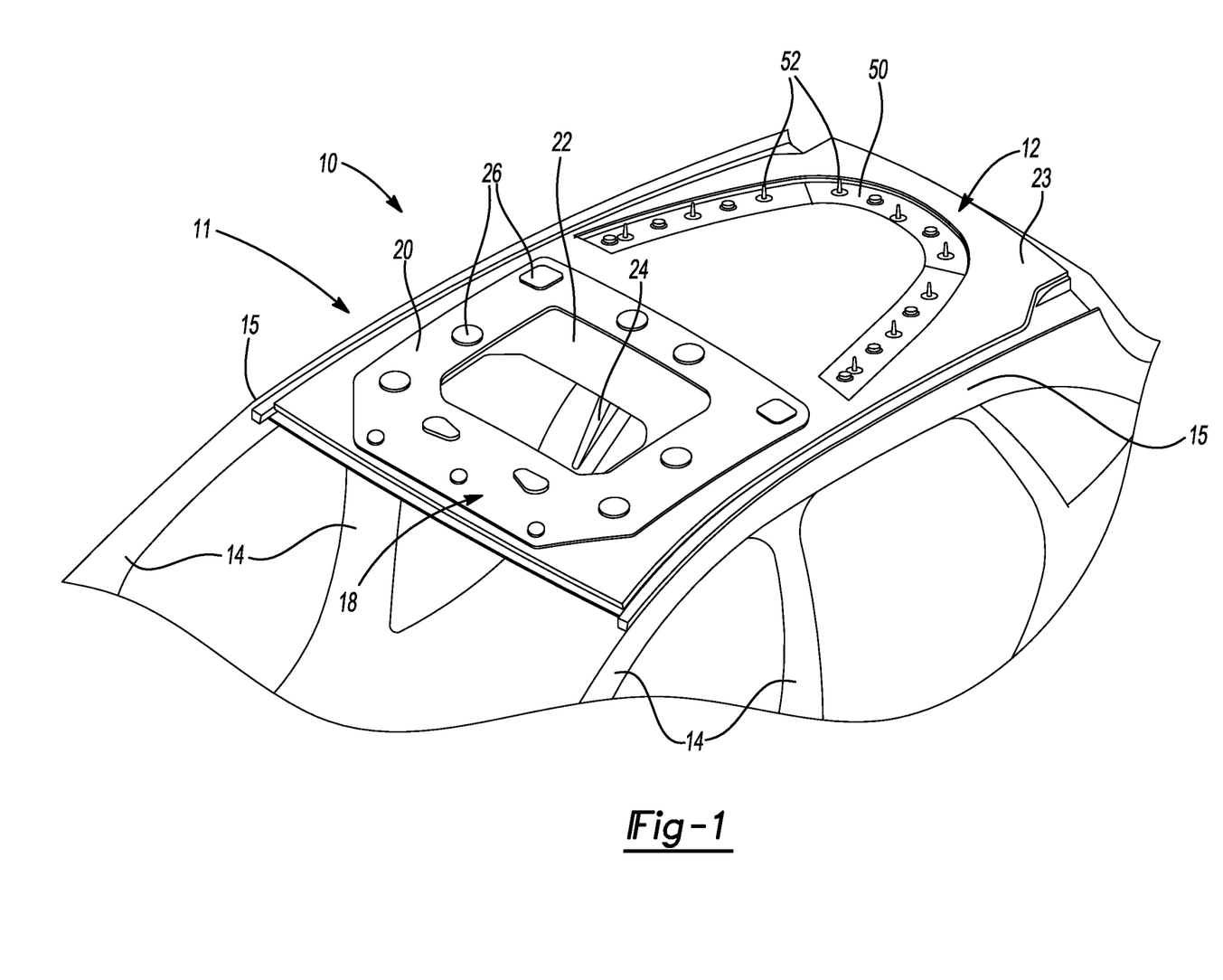
FIG. 1 is a perspective view of a roof of a vehicle including a structural mount assembly according to the principles of the present disclosure.
Figure 2:
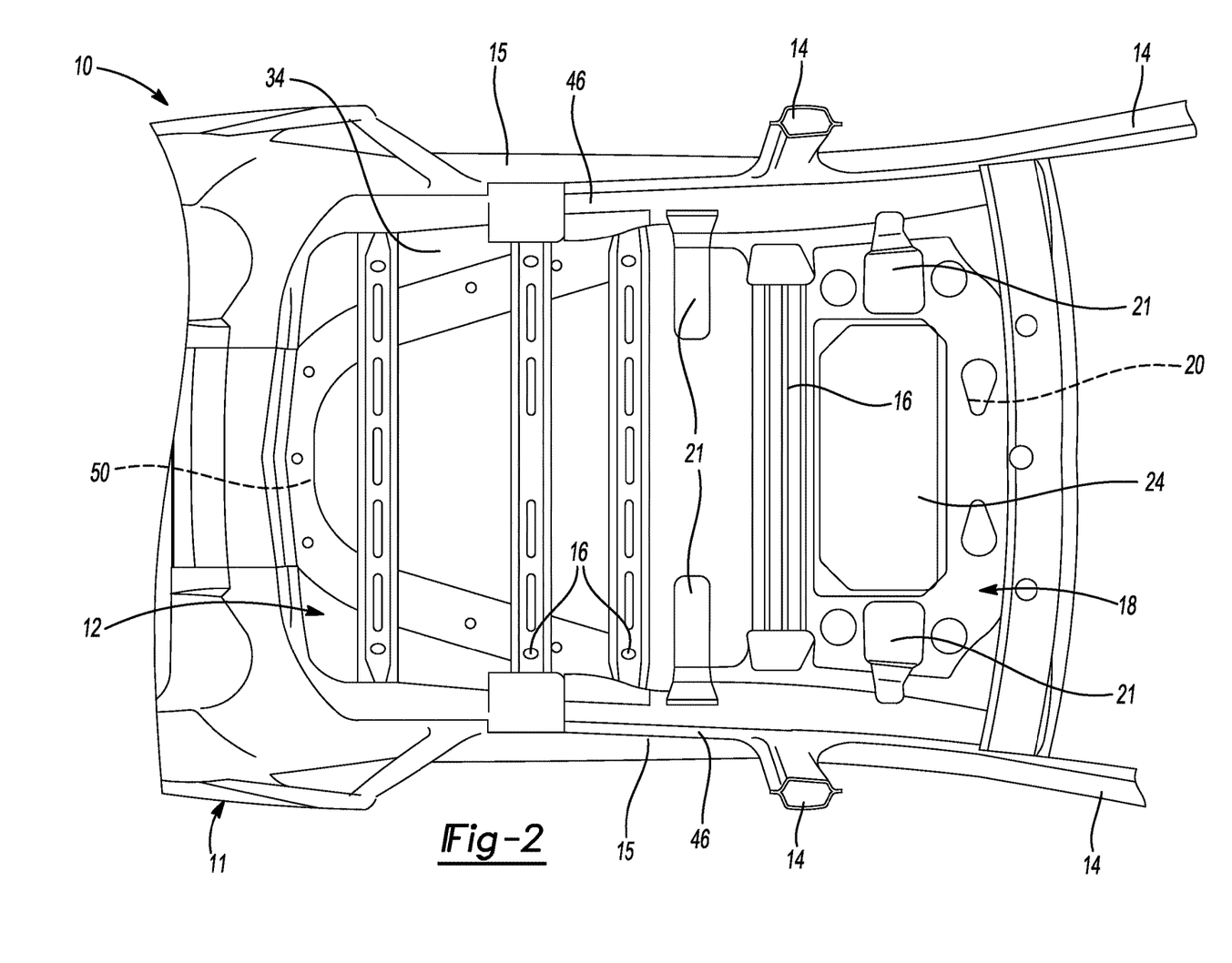
FIG. 2 is a bottom view of an interior of a roof panel of the vehicle including the structural mount assembly of FIG. 1.
Figure 3:
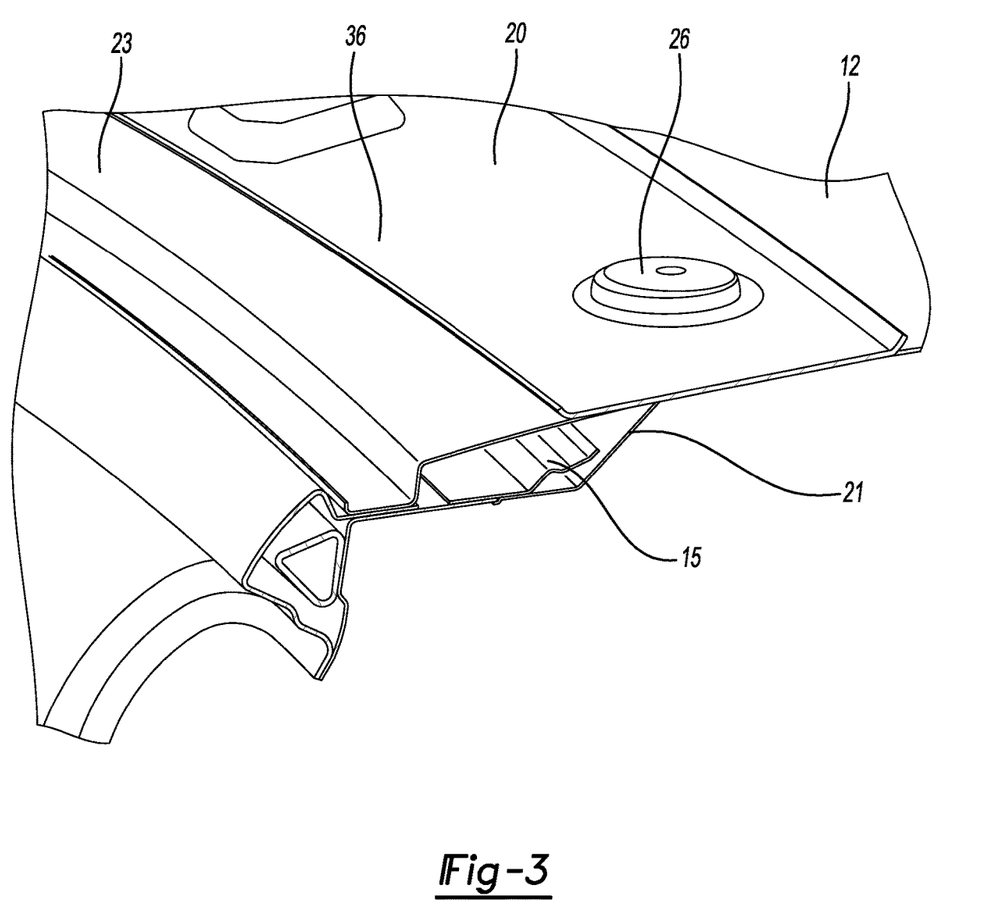
FIG. 3 is a perspective view of a portion of the roof panel of the vehicle of FIG. 1.
Figure 4:
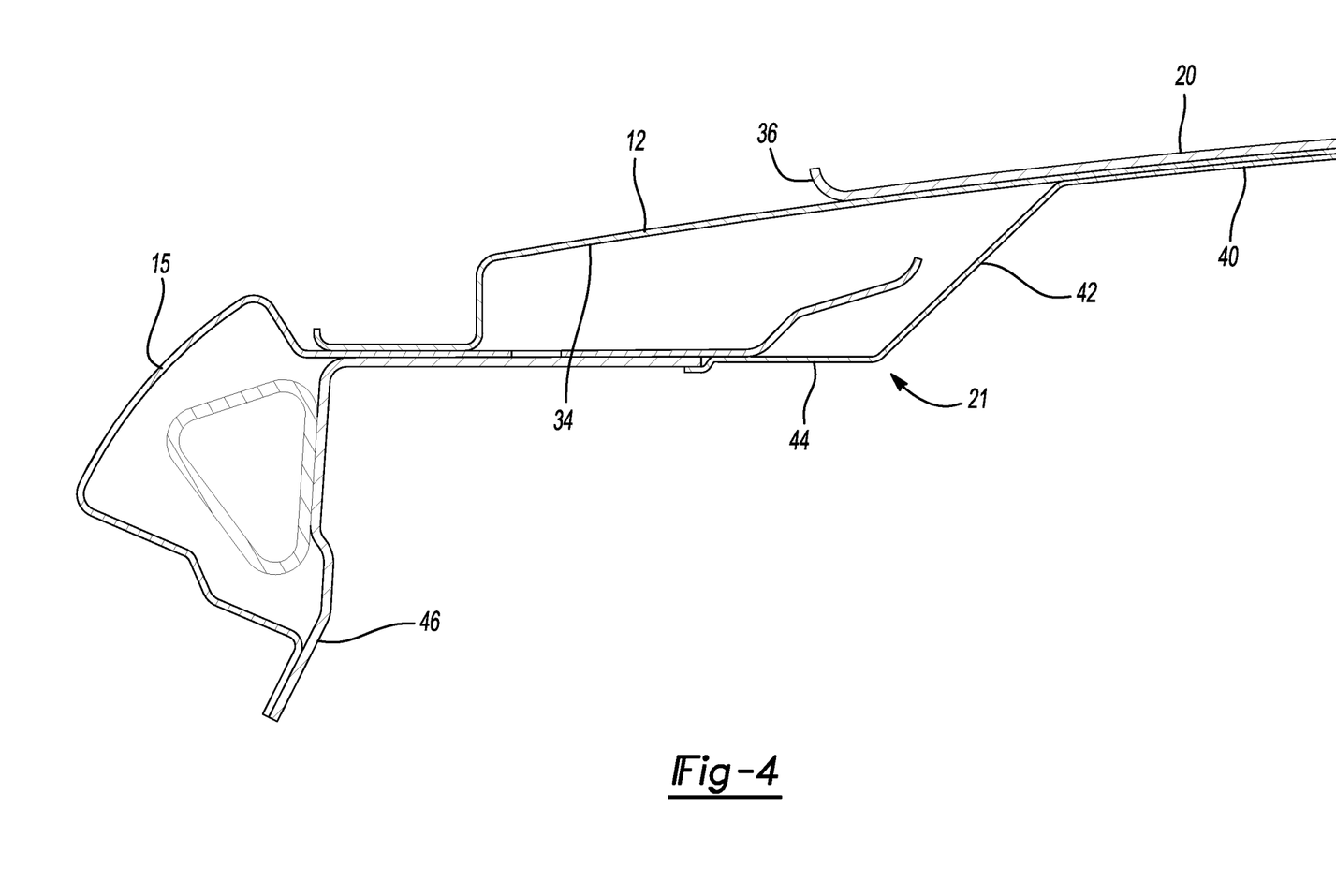
FIG. 4 is a cross-sectional view of a portion of the roof panel of the vehicle of FIG. 1.
Figure 5:
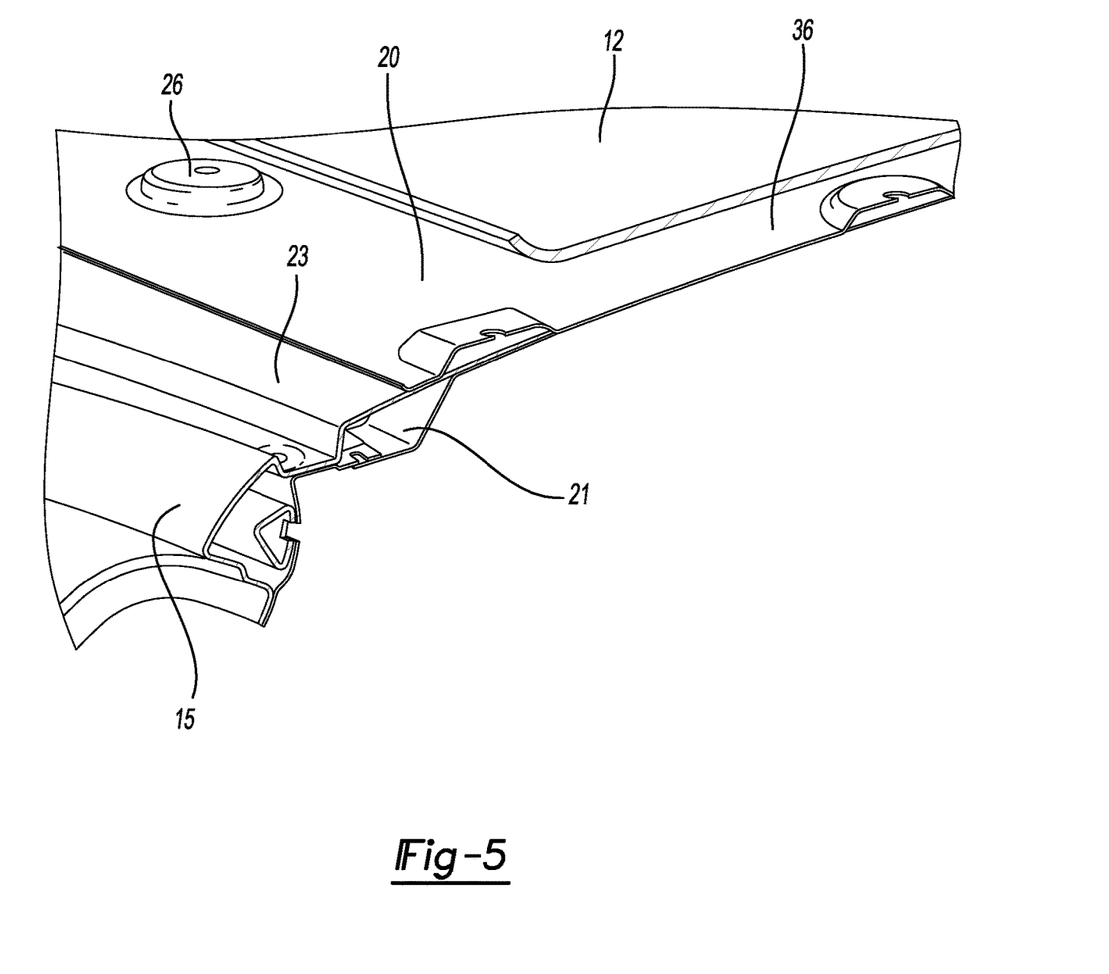
FIG. 5 is a perspective view of a portion of the roof panel of the vehicle of FIG. 1.
Figure 6:
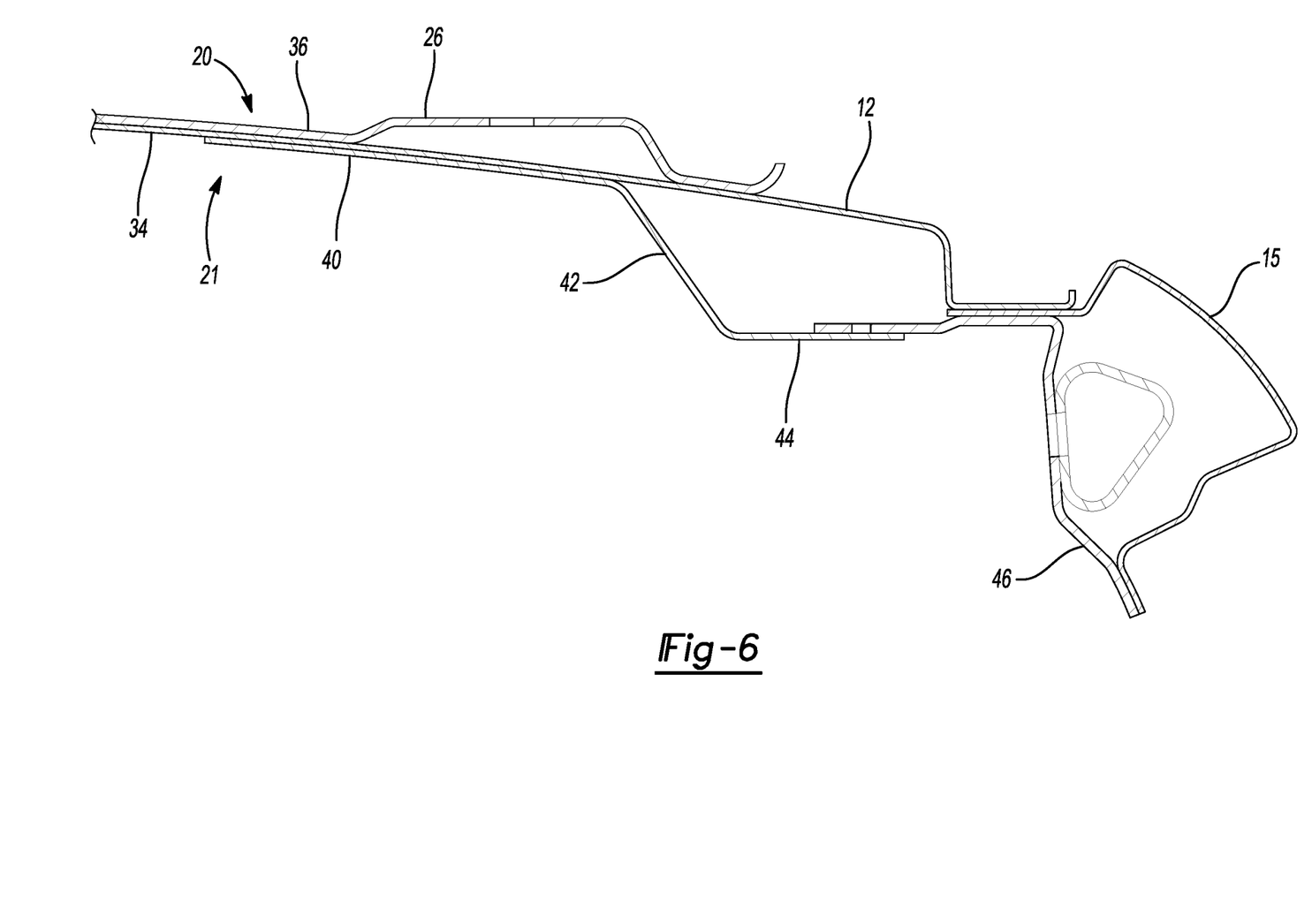
FIG. 6 is a cross-sectional view of a portion of the roof panel of the vehicle of FIG. 1.

As shown in FIGS. 1 and 2, a vehicle 10 is provided such as an autonomous vehicle. The vehicle 10 includes a body 11 having a roof panel 12. The body 11 also includes a plurality of support members or pillars 14 (e.g., A-pillars, B-pillars, etc.), a pair of roof rails 15 and a plurality of support beams 16 (FIG. 2). The support beams 16 are secured to and extend between the roof rails 15 in a transverse direction relative to a longitudinal direction of the vehicle 10. The support beams 16 are also spaced apart from each other along the longitudinal direction of the vehicle 10. A structural mount assembly 18 is secured to the roof panel 12 and includes a D-shaped exterior bracket 20 and a plurality of interior brackets 21 (FIG. 2).

Figure 7A:
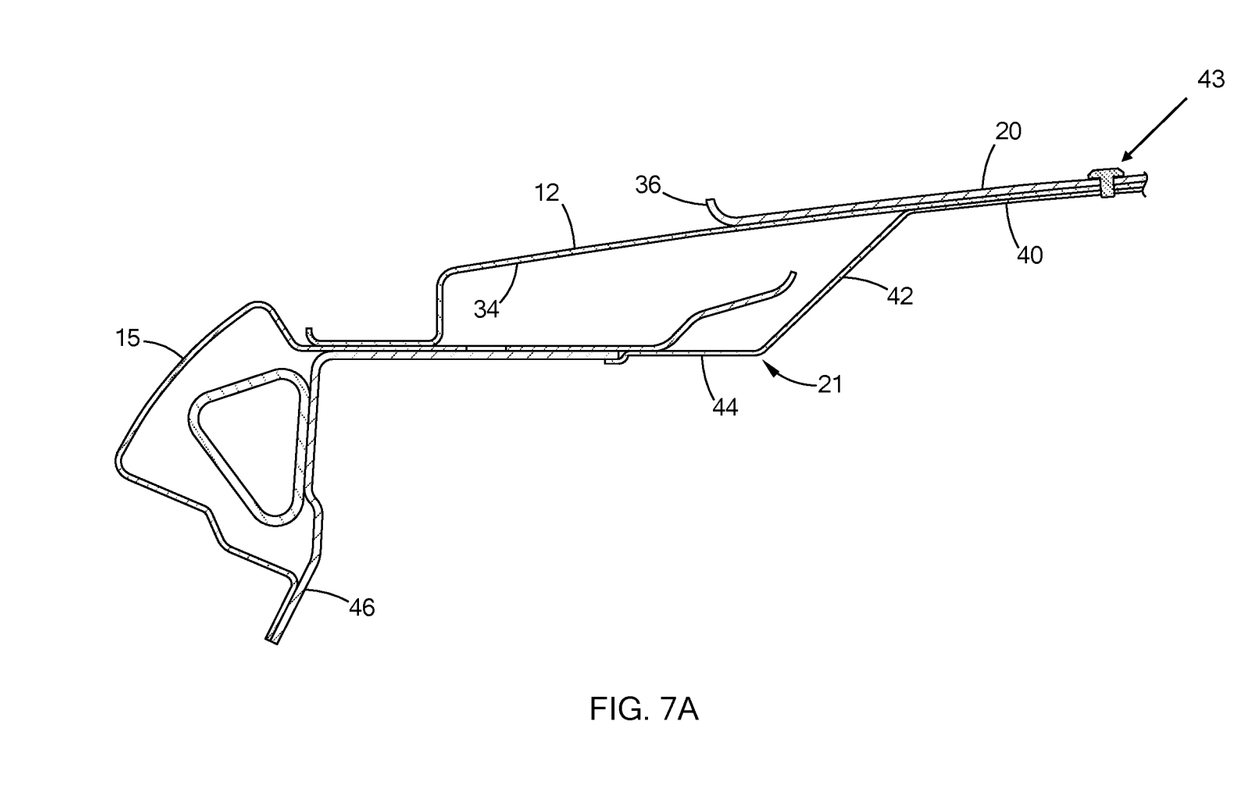
FIG. 7A is a cross-sectional view of a portion of an alternate roof panel that can be incorporated into the vehicle of FIG. 1.
Figure 7B:
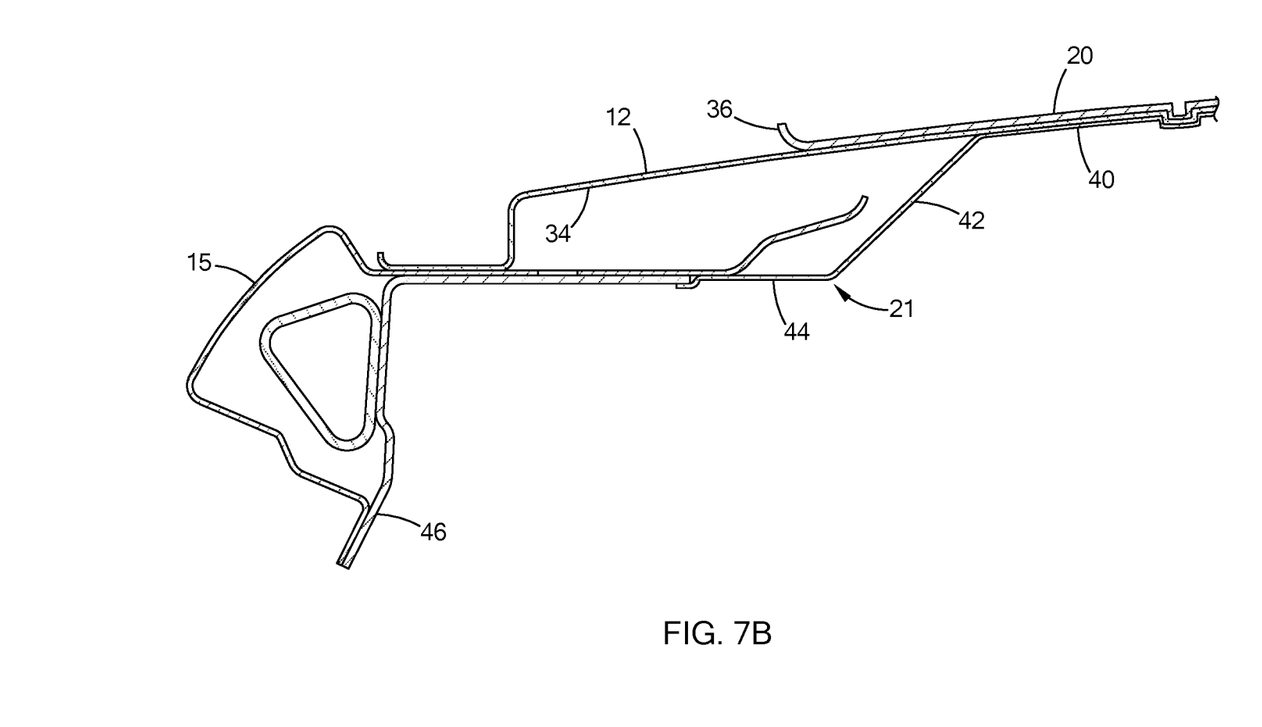
FIG. 7B is a cross-sectional view of a portion of another alternate roof panel that can be incorporated into the vehicle of FIG. 1.

With reference to FIGS. 1 and 3-6, the exterior bracket 20 may be made of a metal material (e.g., aluminum) and is located entirely external to the vehicle 10 (i.e., the exterior bracket 20 does not extend through an opening 24 in the roof panel 12). The exterior bracket 20 is secured to an exterior surface 23 of the roof panel 12 at or near a fore end of the vehicle 10. In one example, the exterior bracket 20 may be mechanically fastened (FIG. 7A) to the exterior surface 23 of the roof panel 12 via fasteners 43 such as bolts, screws, or rivets, for example. In another example, the exterior bracket 20 may be secured to the exterior surface 23 of the roof panel 12 via welding or clinching (FIG. 7B). The exterior bracket 20 may have an opening 22 that is aligned with the opening 24 in the roof panel 12 such as a moonroof or sunroof opening. In one example, the opening 24 may accommodate installation of a moonroof (not shown) or sunroof (not shown) in the vehicle 10.

The exterior bracket 20 includes a plurality of attachment features or stanchions 26 for mounting and supporting a sensor structure 28. In one example, the sensor structure 28 is mechanically fastened to the attachment features 28 via fasteners. In another example, the sensor structure 28 may be secured to the attachment features 26 via welding. The sensor structure 28 may include long range radar units, short range radar units, and/or cameras, for example.

With reference to FIGS. 2-6, the plurality of interior brackets 21 are made of a metal material (e.g. aluminum) and extend in a transverse direction relative to the roof panel 12. Each interior bracket 21 is disposed on an interior surface 34 of the roof panel 12 and is secured to the exterior bracket 20 through the roof panel 12 (i.e., the roof panel 12 is positioned between the exterior bracket 20 and the interior brackets 21). In one example, each interior bracket 21 is mechanically fastened to the exterior bracket 20 through the roof panel 12 via fasteners such as bolts, screws, or rivets, for example (i.e., the fasteners extend through the interior bracket 21, the roof panel 12, and the exterior bracket 20). In another example, each interior bracket 21 is secured to the exterior bracket 20 through the roof panel 12 via clinching or welding. Each interior bracket 21 is positioned between two support beams 16. Each interior bracket 21 is also positioned between a respective roof rail 15 and a respective side 36 of the exterior bracket 20. In one example, two of the interior brackets 21 are secured to opposing sides 36 of the exterior bracket 20 (FIG. 2).

Each interior bracket 21 includes a roof attachment portion 40, a transition portion 42 and a frame attachment portion 44. The roof attachment portion 40 is secured to the exterior bracket 20 through the roof panel 12 (i.e., the roof attachment portion 40 abuts against the interior surface 34 of the roof panel 12). The transition portion 42 extends laterally outwardly and downwardly from the roof attachment portion 40. The frame attachment portion 44 extends from the transition portion 42 and is secured to a respective roof rail 15 via an L-shaped support bracket 46. In this way, the structural mount assembly 18 and the sensor structure 28 are supported by the roof rails 15. The frame attachment portion 44 may be mechanically fastened to the respective roof rail 15 or may be secured to the respective roof rail 15 via welding, for example. In some configurations, the frame attachment portion 44 may be secured directly to the respective roof rail 15. In other configurations, the frame attachment portion 44 may be secured to one of the pillars 14, in addition to, or instead of, being secured to the respective roof rail 15.

With reference to FIG. 1, a U-shaped exterior bracket 50 may optionally be secured to the exterior surface 23 of the roof panel 12 at or near an aft end of the vehicle 10. The exterior bracket 50 may be made of a metal material (e.g., aluminum) and is located entirely external to the vehicle 10. In one example, the exterior bracket 50 may be mechanically fastened to the exterior surface 23 of the roof panel 12 via fasteners such as bolts, screws, or rivets, for example. In another example, the exterior bracket 50 may be secured to the exterior surface 23 of the roof panel 12 via welding or clinching. The exterior bracket 50 includes a plurality of attachment features or studs 52 for further mounting and supporting the sensor structure 28. In one example, the exterior bracket 20 may mount and support the sensor structure 28 and the exterior bracket 50 may mount and support a separate sensor structure (not shown). Interior brackets (not shown) similar to interior brackets 21 described above may optionally be disposed on the interior surface 34 of the roof panel 12 and may be secured to the exterior bracket 30 through the roof panel 12.

The structural mount assembly 18 of the present disclosure provides the benefit of supporting the sensor structure 28 while reducing the amount of modification, welding, and/or assembly steps needed to attach the structural mount assembly 18 to the vehicle 10. The structural mount assembly 18 of the present disclosure also provides the benefit of reducing roof penetrations in the vehicle 10, which inhibits fluids from flowing through into the occupant cabin.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A structural mount assembly for a roof panel of a vehicle, the structural mount assembly comprising:
   an exterior bracket secured to an exterior surface of the roof panel, the exterior bracket including a plurality of stanchions for mounting a sensor structure;

a plurality of interior brackets disposed on an interior surface of the roof panel and being secured to the exterior bracket through the roof panel; and another exterior bracket secured to the exterior surface of the roof panel and separate from the exterior bracket, the another exterior bracket extending in an arcuate shape from a first end toward a second end and including studs for mounting the sensor structure.

2. The structural mount assembly according to claim 1, wherein each interior bracket includes a roof attachment portion and a frame attachment portion, and wherein the roof attachment portion is secured to the exterior bracket through the roof panel and the frame attachment portion is secured to a vehicle frame.

3. The structural mount assembly according to claim 1, wherein the exterior bracket is mechanically fastened to the exterior surface of the roof panel.

4. The structural mount assembly according to claim 1, wherein the exterior bracket is secured to the exterior surface of the roof panel via welding or clinching.

5. The structural mount assembly according to claim 1, wherein the exterior bracket has a D-shaped profile.

6. The structural mount assembly according to claim 1, wherein the interior brackets are mechanically fastened to the exterior bracket through the roof panel.

7. The structural mount assembly according to claim 1, wherein the interior brackets are secured to the exterior bracket through the roof panel via clinching or welding.

8. The structural mount assembly according to claim 1, wherein the exterior bracket is located entirely external to the vehicle.

9. The structural mount assembly according to claim 1, wherein two of the interior brackets are secured to opposed sides of the exterior bracket, the opposed sides extending along a length of the vehicle.

10. The structural mount assembly according to claim 1, wherein at least one of the interior brackets extend in a transverse direction relative to a longitudinal direction of the vehicle.

11. The structural mount assembly according to claim 1, wherein the another exterior bracket being U-shaped.

12. A structural mount assembly for a roof panel of a vehicle, the structural mount assembly comprising:
   an exterior bracket secured to an exterior surface of the roof panel, the exterior bracket including a plurality of stanchions;
   a sensor structure mounted to the stanchions of the exterior bracket; and
   a plurality of interior brackets disposed on an interior surface of the roof panel and between a respective side of the exterior bracket and a respective roof rail, the interior brackets being secured to the exterior bracket through the roof panel; and
   another exterior bracket secured to the exterior surface of the roof panel and separate from the exterior bracket, the another exterior bracket extending in an arcuate shape from a first end toward a second end and including studs for mounting the sensor structure.

13. The structural mount assembly according to claim 12, wherein the interior brackets are secured to the exterior bracket through the roof panel via clinching or welding.

14. The structural mount assembly according to claim 12, wherein the exterior bracket is mechanically fastened to the exterior surface of the roof panel.

15. The structural mount assembly according to claim 12, wherein the exterior bracket is secured to the exterior surface of the roof panel via welding or clinching.

16. The structural mount assembly according to claim 12, wherein the exterior bracket and the interior brackets are made of a metal material.

17. A vehicle comprising:
   a roof panel;
   an exterior bracket secured to an exterior surface of the roof panel, the exterior bracket including a plurality of stanchions;
   a sensor structure mounted to the stanchions of the exterior bracket;
   a plurality of interior brackets disposed on an interior surface of the roof panel and being secured to the exterior bracket through the roof panel; and
   another exterior bracket secured to the exterior surface of the roof panel and separate from the exterior bracket, the another exterior bracket extending in an arcuate shape from a first end toward a second end and including studs for mounting the sensor structure.

18. The vehicle according to claim 17, wherein the interior brackets extend in a transverse direction relative to the roof panel.

19. The vehicle according to claim 17, wherein each interior bracket includes a roof attachment portion and a frame attachment portion, and wherein the roof attachment portion is secured to the exterior bracket through the roof panel and the frame attachment portion is secured to a respective roof rail.

20. The vehicle according to claim 17, further comprising opposed roof rails, each interior bracket being positioned between a respective roof rail and a respective side of the exterior bracket.

\* \* \* \* \*